US009577461B2

(12) United States Patent
Dow et al.

(10) Patent No.: US 9,577,461 B2
(45) Date of Patent: Feb. 21, 2017

(54) MULTI AXIS VIBRATION UNIT IN DEVICE FOR VECTORED MOTION

(71) Applicant: International Business Machines Corporation, Armonk, NY (US)

(72) Inventors: Eli M. Dow, Poughkeepsie, NY (US); James Paul Gilchrist, Poughkeepsie, NY (US); Steven Kent Schmidt, Essex Junction, VT (US); Charles James Stocker, Princeton, NJ (US)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 14/253,955

(22) Filed: Apr. 16, 2014

(65) Prior Publication Data

US 2015/0303732 A1 Oct. 22, 2015

(51) Int. Cl.
*H02J 7/00* (2006.01)
*H02J 7/02* (2016.01)
*H02J 7/04* (2006.01)

(52) U.S. Cl.
CPC . *H02J 7/025* (2013.01); *H02J 7/04* (2013.01)

(58) Field of Classification Search
CPC ........ H02J 7/0026; H02J 7/0063; H02J 5/005; H02J 7/0011; H02J 7/0031; H02J 7/025; H02J 7/0006; H02J 7/0042; H02J 17/00; H02J 7/0045; H02J 7/007; H02J 7/041; H02J 7/042; H02J 7/00; H02J 7/0021
USPC .................................................. 320/107–115
See application file for complete search history.

(56) References Cited

U.S. PATENT DOCUMENTS

| | | | |
|---|---|---|---|
| 7,392,068 B2 | 6/2008 | Dayan et al. | |
| 7,683,572 B2 | 3/2010 | Toya | |
| 8,067,921 B2 | 11/2011 | Sip et al. | |
| 8,305,036 B2 | 11/2012 | Toya et al. | |
| 8,354,821 B2 | 1/2013 | Cheng et al. | |
| 2007/0114967 A1 | 5/2007 | Peng | |
| 2008/0238360 A1* | 10/2008 | Stone | H01M 2/1027 320/107 |
| 2010/0201513 A1 | 8/2010 | Vorenkamp et al. | |
| 2010/0315038 A1 | 12/2010 | Terao et al. | |
| 2011/0074344 A1 | 3/2011 | Park et al. | |
| 2011/0316486 A1* | 12/2011 | Inaba | B60L 1/003 320/150 |

(Continued)

FOREIGN PATENT DOCUMENTS

WO WO 2011112009 A2 9/2011
WO WO 2011122789 A2 10/2011

OTHER PUBLICATIONS

ISO/IEC 18092 International Standard, Second Edition, Mar. 15, 2013, Information Technology—Telecommunications and Information . . . Interface and Protocol (NFCIP-1).

(Continued)

*Primary Examiner* — Binh Tat
(74) *Attorney, Agent, or Firm* — Steven Chiu (57) ABSTRACT

Charging a first device by a second device. The first device determines a first position of the first device relative to the second device. Based on the charging position, automatically moving, by the first device, into a second position on the second device. The first device comprises a first motor and a second motor. The first motor is capable of moving the first device along a first axis. The second motor is capable of moving the first device along a second axis.

18 Claims, 8 Drawing Sheets

(56) References Cited

U.S. PATENT DOCUMENTS

| | | |
|---|---|---|
| 2012/0043931 A1 | 2/2012 | Terao et al. |
| 2012/0043932 A1 | 2/2012 | Nakama |
| 2012/0100777 A1 | 4/2012 | Hsu |
| 2012/0146579 A1 | 6/2012 | Shukuya et al. |
| 2012/0200254 A1 | 8/2012 | Yoon |
| 2012/0212178 A1 | 8/2012 | Kim |
| 2012/0229264 A1 | 9/2012 | Bosch et al. |
| 2012/0235636 A1 | 9/2012 | Partovi |
| 2012/0306440 A1 | 12/2012 | Yeh |
| 2012/0326659 A1 | 12/2012 | Shukuya |
| 2013/0314050 A1* | 11/2013 | Matsubara ............... H02J 7/00 320/134 |

OTHER PUBLICATIONS

MIT Technology Review, "Wireless charging—Has Its Time Finally Arrived?", by Jessica Leber on Sep. 11, 2012.
ZigBee Alliance Article, "ZigBee IP Stack Overview", Pacific Gas and Electric, by Don Sturek, pp. 1-15, 2009.
Article in IEEE Circuits and Devices Magazine, by Rob A. Rutenbar, entitled "Simulated Annealing Algorithms: An Overview", pp. 19-26, Jan. 1989.

* cited by examiner

MULTI AXIS VIBRATION UNIT IN DEVICE FOR VECTORED MOTION

BACKGROUND

The present disclosure relates generally to devices, such as mobile devices, and more specifically, to vectored motion in devices.

Traditional mobile phones and pagers incorporate a vibrational motor that work on a rotational means to provide a single form of vibrational motion control over this device. This form of vibrational motion control results in a limited set of user feedback options which can be generated from the restrictive nature of the vibrational mechanisms incorporated in present systems. Attempts to provide a fine grained motion control or vibration based feedback are limited to pulsing a single mode of operation on an off for arbitrary periods of time.

BRIEF SUMMARY

According to one embodiment of the invention, a method, system, and program product is provided. A first device is charged by a second device. The first device determines a first position of the first device relative to the second device. Based on said charging position, automatically moving, by the first device, into a second position on the second device. The first device comprises a first motor and a second motor. The first motor is capable of moving the first device along a first axis. The second motor capable of moving the first device along a second axis.

According to one embodiment of the invention, a first charge rate based on said first position of said first device is measured. The automatically moving based on the first position, further comprises measuring a second charge rate based on the second position of the first device, comparing the first charge rate with the second charge rate, and based on the comparison, automatically moving the first device into a third position on the second device.

According to one embodiment of the invention, the second position and the third position are random movements According to one embodiment of the invention, automatically moving based on the comparison is further based on when the first charge rate has a lower value or equal value than the second charge rate.

According to one embodiment of the invention, automatically moving based on said comparison is the based on when the first charge rate has a higher value or equal value than said second charge rate. The third position is the same as the first position.

According to one embodiment of the invention, a distance from the first position to a beacon on the second device is determined. The automatically moving is further based on the distance.

According to one embodiment of the invention, a rotational position from said first position to a second beacon on said second device is determined. The automatically moving is further based on the rotational position.

According to one embodiment of the invention, the second position is a position with an efficient charge rate on the second device.

According to one embodiment of the invention, the second position is a position with an efficient charge rate on the second device.

According to one embodiment of the invention, the first device is placed on the second device.

According to one embodiment of the invention, the first motor operates independently of the second motor.

According to one embodiment of the invention, the second device comprises a flat surface for the first device to move upon.

According to one embodiment of the invention, the automatically moving of the first device comprises rotating, by the first motor and the second motor, the first device.

According to one embodiment of the invention, automatically moving of the first device comprises being alternatively vibrated in a plurality of directions.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

In accordance with an embodiment of the invention, a method, system, and computer program product is provided for a main device, such as a mobile device, in particular, utilizing a multi axis vibration unit. The multi axis vibration unit may be a multi axis vibration motor, multiple linear axis vibrational motors in series or parallel, or any other combination of vibration motors. This would allow the main device, such as the device to be charged, for example a mobile device, a tablet, a phone, etc, equipped with the multi axis vibration unit, to physically move with controllably, predicable, and vectored direction.

In one embodiment of the invention, vectored direction may be achieved through the use of a multi axis vibration unit. This would allow autonomous movement of the main device towards an optimal location on the surface of a charging device, such as a charging pad. The charging device may be standalone hardware, or incorporated into other hardware. When charging, the charging device puts energy into the main device though charging technologies such as inductive charging (electromagnetic induction charging), a resonance-based charging, optical charging, microwave power transmission, and any other wireless power transmission schemes. The autonomous movement allows the main device to self propel along the resting plane or surface of the charging surface to facilitate more efficient charging for a main device placed at a less than perfect position on the charging device.

An example of a charging technology is inductive charging, which requires a primary coil to generate an electromagnetic field that is picked up by a second coil mounted underneath the main device to charge the battery pack. Inductive charging is not known to be particularly efficient because large amounts of energy dissipate through the coil. Inductive charging is further described in "Wireless Charging—Has Its Time Finally Arrived?" by Jessica Leber, MIT Technology Review, Sep. 11, 2012, hereby incorporated by reference, and may be further described by. Another example is resonance-based charging system, where the primary coil and the second coil are connected with capacitors that resonate at a specific frequency. This allows for energy losses to be reduced and to allow for energy transmission to be at a faster rate and further apart. As example is optical wireless charging, which requires aligning an optical charging photocopier to a light emitter for charging, as described in "Method and apparatus for optical wireless charging" by Chen Peng, US 2007/0114967, filed on Nov. 18, 2005, hereby incorporated by reference.

US 2007/0114967 describes: A portable electronic device is recharged by generating light from a light source of a wireless optical charger, converting the light from the charger into an electrical signal using a photovoltaic cell of the portable electronic device and charging the portable electronic device using the electrical signal. The wireless optical charger may include a proximity sensor that switches on the light source when a portable electronic device is close to the light source.

Figure 1:
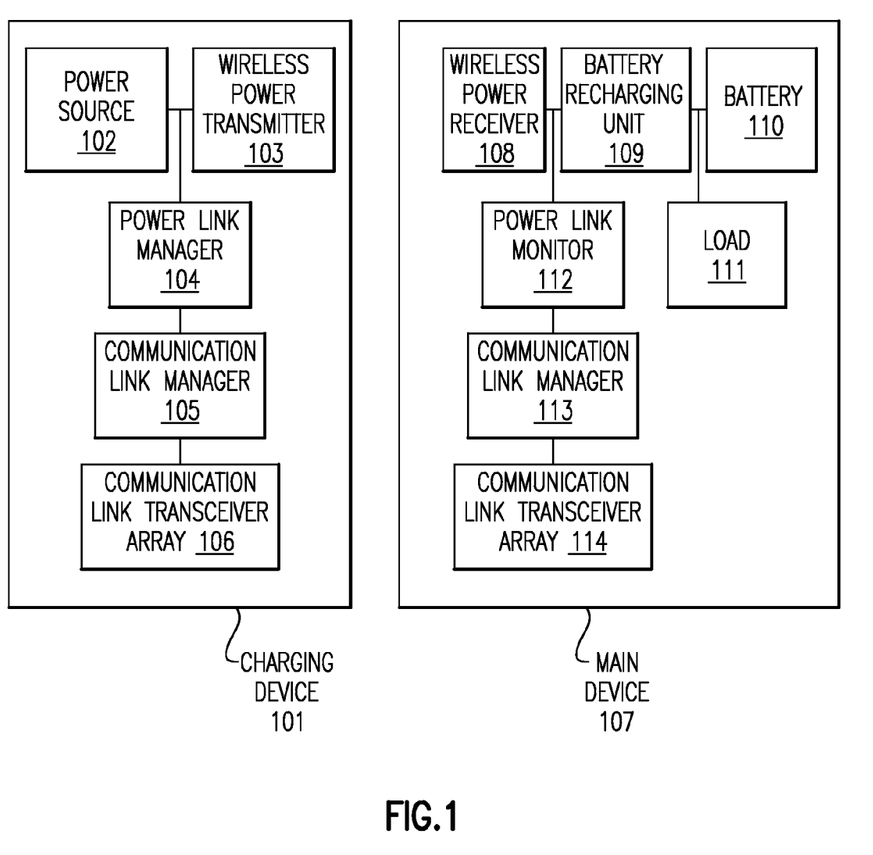
FIG. 1 illustrates a power transfer system in accordance with an embodiment of the invention.

On embodiment of a power transfer system is described in reference to FIG. 1. The power transfer system, or charging system, comprises a charging device 101 and a main device 107 to be charged. The charging device 101 is used to charge the main device 107. Charging device 101 comprises a power source 102, a wireless power transmitter 103, a power link manager 104, a communication link manager 105, and a communication link transceiver array 106. The power source 102, for example a continuous direct current (DC) or alternating current (AC) voltage from a connection to main wiring or battery. The wireless power transmitter 103 transmits power wireless to the main device 107. For example, in the case of inductive charging, it may be an inductive coil as is known in the art. For example, in the case of optical wireless charging, it may be a photo emitter. The power link manager 104 is responsible for detecting the presence and capacity of the power source 102, as well as monitoring and regulating the power supplied to the wireless power transmitter 103. The communication link manager 105 is responsible for monitoring, managing, and interpreting the signals from one or more communications transceivers present. Those transceivers being logically grouped into communication link transceiver array 106. The communication link transceivers may be any type of transceiver, for example wifi, Zigbee, near field communication (NFC), cellular, Bluetooth, optical signal communications, or any communications that would allow for transmission and receipt of signals. Zigbee is described in "ZigBee IP Stack Overview" by Don Sturek, 2009, hereby incorporated by reference. NFC is described in the NFC standard titled "Information technology—Telecommunications and information exchange between systems—Near Field Communication—Interface and Protocol", ISO/IEC 18092:2013, 2nd edition, published Mar. 15, 2013, hereby incorporated by reference. In one embodiment, the communication link transceiver array 106 may deal with wireless signal communication. In another embodiment, the communication link transceiver array 106 may deal with wired signal communication.

The main device 107 comprises a wireless power receiver 108, a battery recharging unit 109, a battery 110, a load 111, power link monitor 112, a communication link manager 113, and a communication link transceiver array 114. The wireless power receiver 108 receives power from the charging device 101. For inductive charging, the wireless power receiver 108 may be an electromagnetic inductance coil resonant with a corresponding coil in the wireless power transmitter 103 in the charging device 101. For optical wireless charging, the wireless power receiver 108 may be a photoreceiver and associated components for receiving power from an optical transmission. The battery recharging unit 109 monitors and manages the power charging of the battery 110. If the battery 110 is fully charged, the battery recharging unit 109 may cease charging or it may slow the rate of charging as needed. In one embodiment, when the battery 110 is in a low battery power state, the rate of charging may be accelerated or dynamically enabled. The battery 110 is a device that stores chemical energy and converts it into electrical energy. The battery 110 may be charged by the charging device 101. The load 111 is representative of the electrical load imposed or consumed by the main device 107, which may include processors, memory, displays, persistent storage etc. The power link monitor 112 monitors the presence of main supplied power, such as voltage, to the main device 107. The power link monitor 112 also interacts with the wireless power receiver 108 and the battery recharging unit 109 to determine the status of wireless power sources and battery status respectively. The power link monitor 112 may disable the receipt of wireless power by the main device 107 under various circumstances such as full battery and power supplied. The communication link manager 113 may have a similar role as the analogous communications link manager 105 of the charging device 101. It is generally responsible for monitoring, managing, and interpreting the signals from one or more communications transceivers present. Those transceivers being logically grouped into communication link transceiver array 114. For example, communications transceivers may include wifi, Zigbee, cellular, Bluetooth, optical signal communications, near field communication (NFC), or any communication that would allow for transmission and receipt of signals. In one embodiment, the communication link transceiver array 114 may deal with wireless signal communication. In another embodiment, the communication link transceiver array 114 may deal with wired signal communication.

In one embodiment, the load 111 may be comprised of different components of the main device 107 such as a global positioning system (GPS), screen, microphone, infrared sensor, camera, accelerometer, speaker, processor, multi axis vibration unit, etc. The processor may control the multi axis vibration unit, for example a motor array. The motor array may include multiple motor controllers, each with an associated motor.

In one embodiment, when a main device, 107, with a multi axis vibration unit is placed on a charging device, 101, as described in FIG. 1, the multi axis vibration unit may vibrate the main device to physically move the main device to be closer to the optimal charging location on the charging device. Part of the process of vibrating the main device to be closer to the optimal charging location is through the detection of charging protocols, or through circuitry identifying that charging is active. Charging protocols and circuitry identifying charging may include inductive charging (electromagnetic induction charging), a resonance-based charging, optical charging, microwave power transmission, and any other wireless power transmission schemes.

In one embodiment, when a main device 107, such as the one described in FIG. 1, is operatively coupled to a charging device 101, such as the one described in FIG. 1, the main device may be charged as described in "Wireless charging set" by Ryu et al, WO 2011/122789 A2, filed on Mar. 25, 2011, hereby incorporated by reference.

WO 2011/122789 A2 describes: A wireless charging method includes searching one or more rechargeable electronic devices, receiving power service information from one or more searched electronic devices, determining whether the one or more searched electronic devices are rechargeable based on the received power service information, and if the one or more searched electronic devices are rechargeable, receiving power from the electronic devices.

Figure 2:
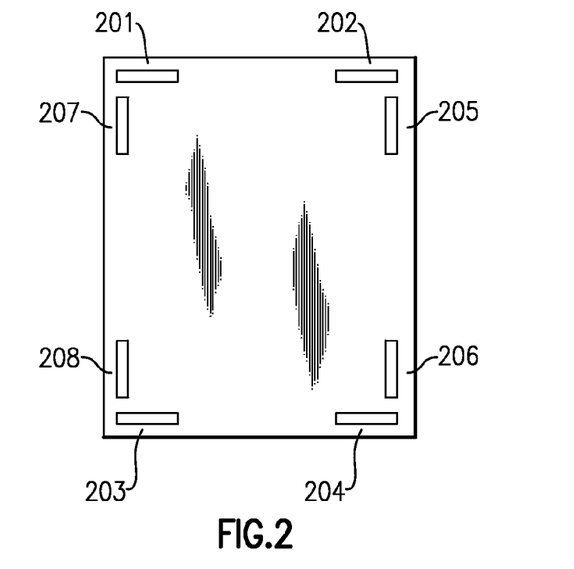
FIG. 2 illustrates the location of motors on a main device in accordance with an embodiment of the invention.

In one embodiment, when a main device, such as the one described in FIG. 2, is operatively coupled to a charging device, such as the one described in FIG. 1, the main device may be charged as described in described in an "Apparatus and method for performing wireless charging" by Won et al WO 2011/112009 A2 filed on Mar. 9, 2011, hereby incorporated by reference.

WO 2011/112009 A2 describes: Provided is a wireless recharging set. A source unit including a source resonator may transmit power wirelessly in all directions, and a main device may receive the transmitted wireless power regardless of location.

In one embodiment, the multi axis vibration unit in the main device may be comprised of motors capable of providing directional feedback. This may include motors such as precision microdrives. For example, as is known in the art, there are microdrives which may be oriented perpendicular to each other provide directional vibration capability when operated as a system. As is also known in the art, a common type of motor is an eccentric rotation mass (ERM) motor, also known as pager motors. These are DC motors with an offset (non-symmetric) mass attached to the shaft. As the motor rotates the eccentric weight, the centripetal forces are unbalanced, causing a small and rapid displacement of the motor. This repeated displacement may also be known as vibration. Down the shaft of a cylindrical ERM is where the eccentric mass will rotate around the center of the motor, following a circular path of movement. This means that the motor is vibrating in two directions, along the X axis and the Z axis. There is no movement in the Y axis. In one embodiment, an ERM motors may be used in the multi axis vibration unit, because they may be functionally equivalent and may be more compact in design.

In one embodiment, the multi axis vibration unit may be comprised of Linear Resonant Actuations, which is known in the art to vibrate on one axis. The Linear Resonant Actuations may be performed through the use of a Linear Resonant Actuator (LRA) motor. LRA motors use a magnet, spring and voice coil to cause motor displacement. The magnet is excited by an electromagnetic field in the voice coil and the spring enables the magnet (which has some mass) to oscillate back and forth around its normal resting position. The magnet is restricted to move in one plane. The LRA motor may be also be in a coin style form factor. LRA are further described in "Smart linear resonant actuator control" by Bosch et al, US 2012/0229264 A1, filed Aug. 26, 2011, hereby incorporated by reference.

US 2012/0229264 describes: The present invention provides a haptics control system that may include a driver to generate a continuous drive signal and to output the drive signal to a mechanical system on an electrical signal line, wherein the continuous drive signal causes the mechanical system to vibrate to produce a haptic effect. The haptics control system may further include a monitor, coupled to the electrical signal line, to capture a Back Electromotive Force (BEMF) signal generated by the mechanical system in the electrical signal line, to measure a BEMF signals attribute, and to transmit an adjustment signal to the driver based on the BEMF signals attribute. The driver is further configured to adjust the continuous drive signal according to the adjustment signal.

In one embodiment, the use of 2 or more LRA motors operating alone or acting simultaneously may be used to move a main device. The LRA motors may be affixed within a plane of the main device. When the motors are operated independently they may move the main device containing the motors in perpendicular directions, for example, X and Y. Each motor may be operated for varying durations or pulses, or used continuously throughout a motion event. Direction may be positive or negative with respect to some origin (the original location). Operating the LRA motors simultaneously may be used to apply torque about the central point between the motors. This capability is expressed as rotation of the main device on the horizontal plane about a central axis (clockwise or counter clockwise with a stationary center point), as well as the ability to perform circular motion of the main device itself through and arc.

One embodiment of the location of motors, which may make up the multi axis vibration unit, on a main device is described in reference to FIG. 2. FIG. 2 illustrates the use of nine motors as part of the multi-vibration unit on the main device. Four of the motors are located horizontally, 201, 202, 203, and 204. Four of the motors are located vertically, 205, 206, 207, and 208. Motors 201, 202, 203, and 204 may operatively vibrate in parallel to one another. Motors 205, 206, 207, and 208 may also operatively vibrate in parallel to one another. {201, 202, 203, 204} (the set of 201, 202, 203, and 204) may operatively vibrate perpendicular to {205, 206, 207, 208} (the set of 205, 206, 207, and 208).

Figure 3:
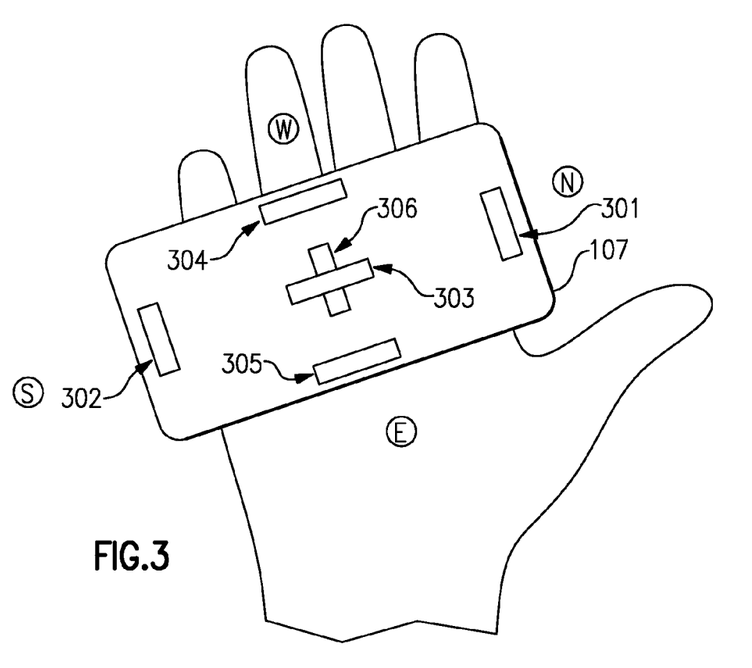
FIG. 3 illustrates the location of motors on a main device in accordance with an embodiment of the invention.

Another embodiment of the location of motors, which may make up the multi axis vibration unit on a main device is described in reference to FIG. 3. The main device 107 may include four motors 301, 302, 304 and 305. Two of the motors 301 and 302 may be in a east to west configuration. The other two motors 304 and 305 may be in a north to south configuration. Motors 301 and 302 may operatively vibrate perpendicular to motors 302, 304, and 305. To rotate counter clockwise, motor 301 may pulse westward and/or motor 302 may pulse eastward, while in parallel, motor 304 may pulse southward and/or motor 305 may pulse northward. To rotate clockwise, motor 301 may pulse eastward and/or motor 302 may pulse westward, while in parallel, motor 304 may pulse northward and/or motor 305 may pulse southward.

In one embodiment, the main device 107 may include two motors 303 and 306, one in a north to south configuration, the other in an east to west configuration. The two motors 303 and 306 may be stacked in depth if the thickness of the main device allows for it. Motors 306 may operatively vibrate perpendicular to motor 303. To rotate counter clockwise, motor 303 may pulse northward and/or motor 306 may pulse westward. Another embodiment to rotate counter clockwise may be to have the motor 303 pulse southward and/or vibrational motor 306 pulse eastward. To rotate clockwise, motor 303 may pulse northward and/or motor 306 may pulse eastward. Another embodiment to rotate clockwise may be to have the motor 303 pulse southward and/or motor 306 pulse westward.

In one embodiment, the locations and number of motors may be a combination of the above two embodiments. It should be noted that there may be multiple configurations for motors. The number of motors and the locations are not limited to the embodiments shown in FIGS. 2 and 3.

In one embodiment, when a main device is placed on a charging device, one of 2 systems can take place:

1) Random Walk for movement of the main device—In this system, the charging rate or charge rate of the main device may increase or decrease depending on the optimal placement of the main device on the charging device. The charge rate is the rate in which a battery would be charged in a fixed time interval. For example, the fixed time interval may be 1 hour. The charge rate may be calculated under a set of voltage and current inputs, such as the present (for computing present charge rate) or anticipated adjustments to voltage and current (for predicting alternative charge rates), up to a known maximum safe charging rate dictated by the current, voltage, and charging capacity/infrastructure of the main device.

This rate could be measured as the main device randomly "walks" or moves on the charging device. For example, a phone may measure its charging rate at a present spot on a charging pad, and when it moves randomly a small amount in a known direction from the origination spot, it'll take a second measurement of the charging rate. If the rate has increased, then the second spot has a more efficient charging rate, and thus the present spot should be considered the new origin. If the rate has decreased, the main device returns to the previously stored origin. Random movement as described above would continue until there are no further moves that would produce an increase in the charging rate from whatever the main device's current position is. When no more moves would have an increased charge rate, this may result in the most optimal charging position on the charging device. One skilled in the art would appreciate that there may need to be some movements through "worse" or lower valued charging states or rates before a rate could be determined to be optimal. Approaches such as simulated annealing and other AI search algorithms could be used to construct more elaborate random walk based approaches which tolerate some degree of degradation before returning to the origin in search of a greater local maxima or the optimal charging location. Simulated annealing is described in "Simulated Annealing Algorithms—An Overview" by Rob A. Rutenbar, IEEE, published January 1989, hereby incorporated by reference.

2) Use of a beacon for movement of the main device— The charging device may include a beacon for identifying the center point of an ideal charging location, such as a centralized optimal placement, for the main device. The main device may include a unit for detecting the beacon such as a transceiver that is part of the communication transceiver array. The beacon may be a near field communication (NFC) beacon. In one embodiment, there may be 2 beacons in the charging device. The first beacon may allow for centralized optimal placement and the second beacon may allow for rotational alignment. This may allow for multiple main devices to be efficiently charged on a on a single charging device. In one embodiment, both beacons may be used to designate the optimal charging position for a single main device. In another embodiment, multiple beacons may be used to signify optimal placement and/or rotational alignment. In one embodiment, the charging device may be shaped a certain way that vibration would slowly move the main device in the appropriate direction, for example with a slight curvature or incline.

Figure 4A:
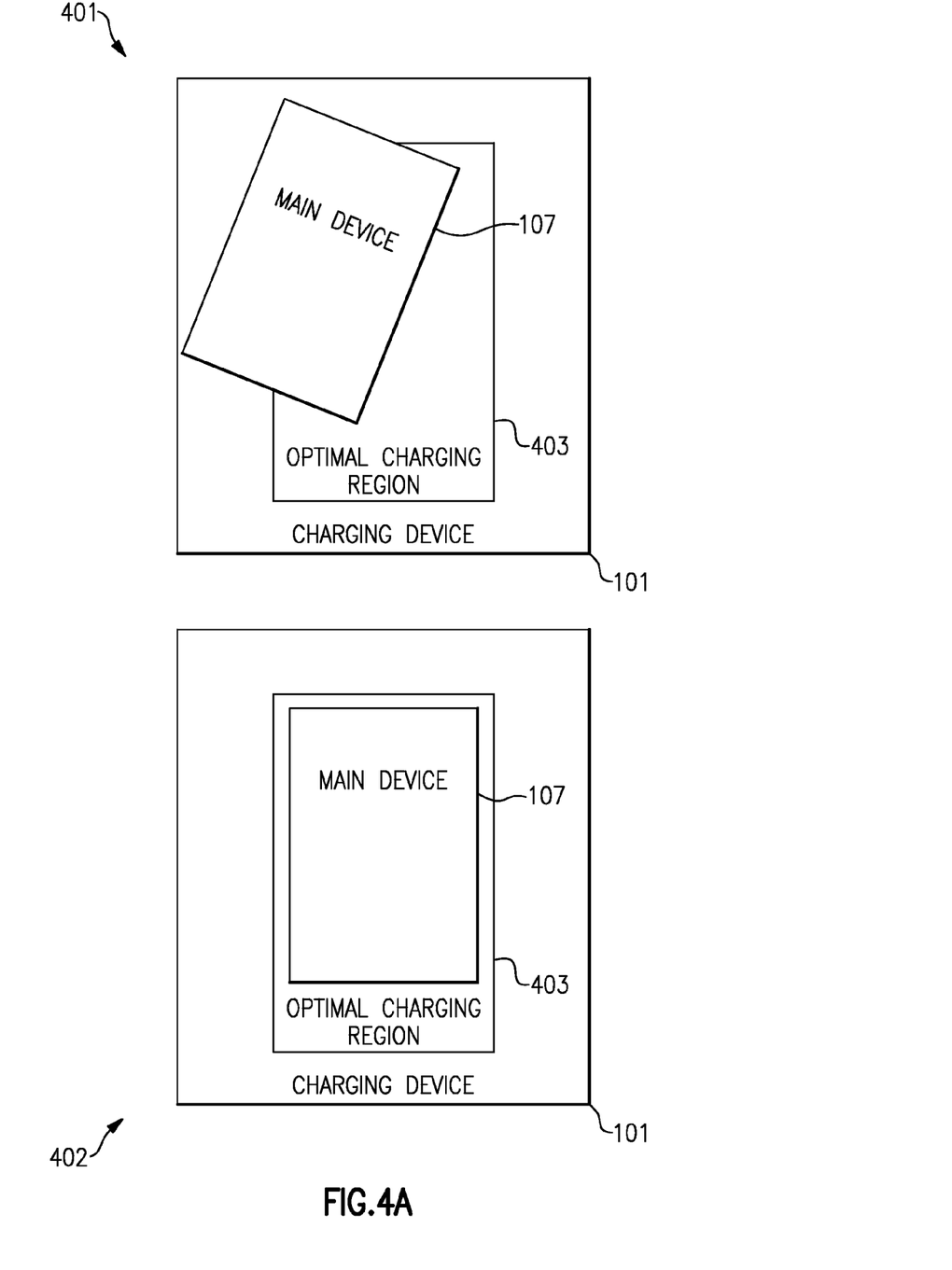
FIG. 4A illustrates a main device on an optimal charging region of a charging device, in accordance with an embodiment of the invention.

One embodiment of a main device on an optimal charging region of a charging device is described in reference to FIG. 4A. 401 illustrates a main device 107 placed by a user on a charging device 101. The charging device has an optimal charging region 401, where the charge rate is the most efficient or optimal. In 401, the main device is placed off center and is not completely located on the optimal charging region 403. As shown in 402, the main device will move itself over into the optimal charging region 403 through the multi axis vibration unit. The optimal charging region may be located in various locations on the charging device, for example in the center of the charging device 101.

Figure 4B:
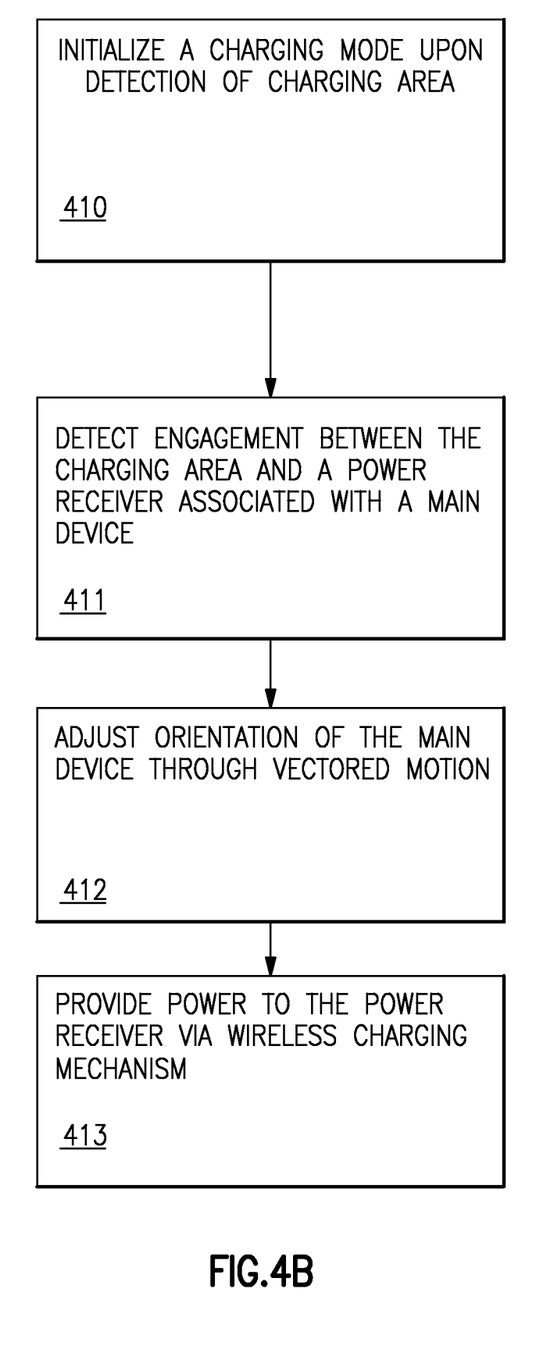
FIG. 4B illustrates process for charging in accordance with an embodiment of the invention.

One embodiment of a process for charging is described in reference to FIG. 4B. A charging device may initialize a charging mode upon detection that the charging area, located on the charging device, is oriented to allow for engagement with a main device, 410. The main device may be placed on the charging area before or after the initialization. The charging device may detect engagement between the charging area and a power receiver associated with the main device, 411. The main device, through the multi-axis vibration unit, may adjust its orientation on the charging area of the charging device through vectored motion, 412. The main device may adjust its orientation so that it is located in an optimal charging region of the charging device. The charging device may provide power to the power receiver of the main device via a wireless charging mechanism, 413. In one embodiment, the orientation adjustment 412 and the providing of power 413 may occur simultaneously, for example the charging may occur while the main device is moving. In one embodiment, 413 occurs after 412 has completed. In one embodiment, 413 may occur prior to 412, when a main device does not have enough power to perform movement. This would allow the main device to obtain enough power to initiate movement for subsequent charging in a more optimal position.

Figure 5:
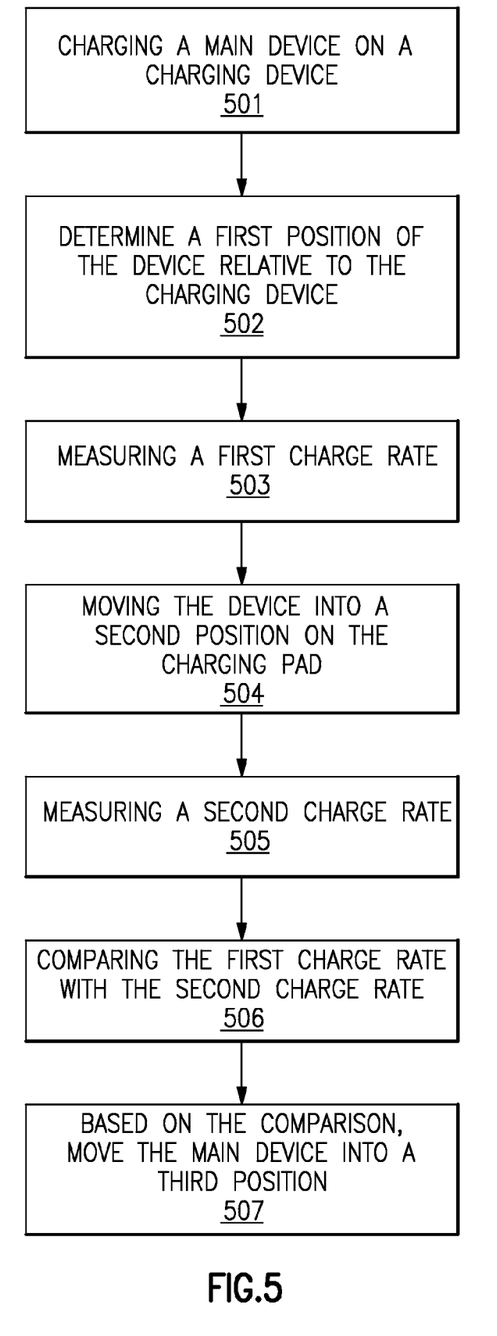
FIG. 5 illustrates a process for charging in accordance with an embodiment of the invention.

One embodiment of a process for charging is described in reference to FIG. 5. A main device may comprise of two motors, each one corresponding with an axis, which allows the main device to vibrate, or move, along the surface of the charging device. This main device is placed on top of charging device, such as a charging device with a flat surface. The main device is charged on the charging device, 501. The first position of the main device is determined relative to the charging device, 502. This first position may be stored. At this first position, a first charge rate is measured, 503. This is the rate at which the charging device is charging the main device. The main device is moved into another position, a second position, on the charging device, 504. This second movement may be a random movement, or it may be a predetermined movement determined by the main device or a user input into the main device. A second charge rate based on the second position is measured. 505. The first charge rate and the second charge rate are compared, 506. Based on the comparison, the main device is moved into a third position, 507. In one embodiment, if the first charge rate is greater than the second charge rate, the third position would be the original first position. This way, the main device would go back to the original position with the better charging efficiency. In one embodiment, if the first charge rate is lesser or equal to the second charge rate, the third position would be a random movement, or it may be a predetermined movement determined by the main device or a user input into the main device. In this case, the third movement would not be equal to the first position, because the main device knows that the first position does not have a more efficient charge rate than the second position. The purpose of the movements described in FIG. 5 is to find the most efficient charge position for the main device on the charging device. In one embodiment, the process repeated until all possible moves are exhausted from the main device's position, where those possible moves have lower charging rates than the main device's current position.

In one embodiment, the main device may store a list of each position that it has moved to, thus allowing the main device to keep track of which positions have already been traversed and whether all possible moves have been exhausted. In one embodiment, the number of possible moves from a given position may be limited to a specific number, either set by the main device or set by a user.

Figure 6:
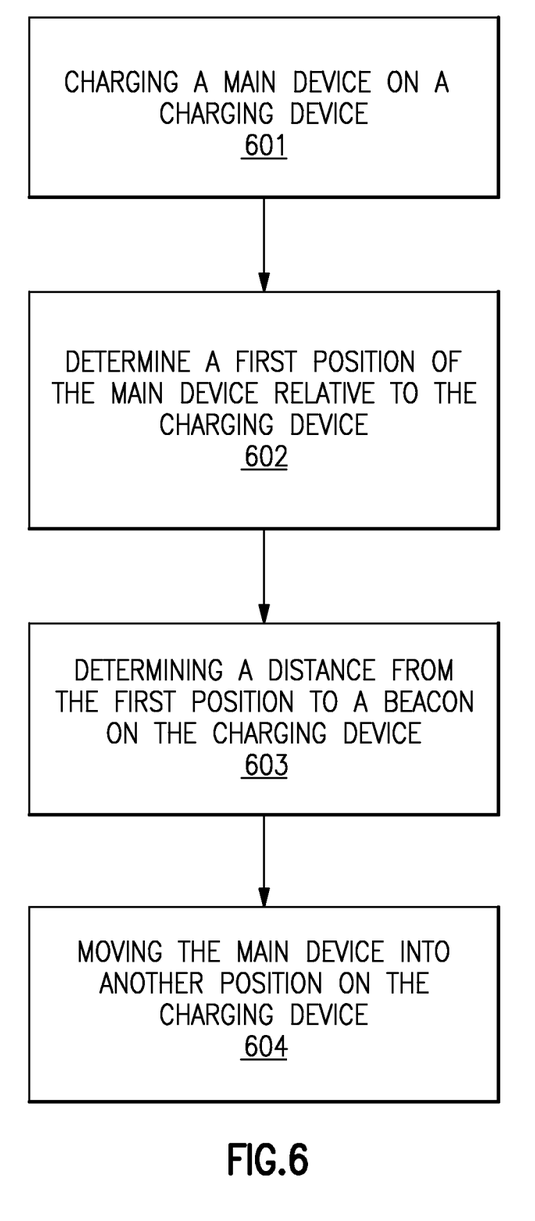
FIG. 6 illustrates a process for charging in accordance with an embodiment of the invention.

One embodiment of a process for charging is described in reference to FIG. 6. A main device may comprise of two motors, each one corresponding with an axis, which allows the device to vibrate, or move, along the surface of the charging device. This main device is placed on top of charging device, such as a charging device with a flat surface. The main device is charged on the charging device, 601. The first position of the main device is determined relative to the charging device, 602. This first position may be stored. The charging device may contain a beacon indicating the most efficient charging position. The distance from the first position to the beacon is determined, 603. Based on the determined distance, the main device is moved into another position, a second position, on the charging device, 604. The main device, therefore, moves toward the beacon, the most efficient charging position, on the charging device. In one embodiment, the charging device has a second beacon. The position of the main device relative to the second beacon may be determined. This beacon may be used to determine the proper rotational alignment of the main device relative to the charging device. In one embodiment, the main device may use relative triangulation to determine the main device's location in reference to the beacon. In another embodiment, the first and the second beacon may be transmitted at a different frequency. For example, one beacon may transmit at a faster frequency, thus allowing the main device to know that the faster beacon is a one orientation, such as north, and that the slower beacon is another orientation, such as south.

In one embodiment, after the placement of the main device onto the charging device and on or before step 501 in FIG. 5 and FIG. 6, the main device determines whether or not the charging device is on. If the charging device is on, and thus charging the main device, the flow described in FIG. 5 and FIG. 6 continue. If the charging device is off, and thus not charging the main device, the main device does not perform any movement, and thus the flow is described in FIG. 5 and FIG. 6 is not performed.

In one embodiment, the motors in the main device operate independently from one another. For example, one motor may operate to vibrate or move the main device along a horizontal axis, while the other motor may operate to vibrate or move the main device along a vertical axis. In one embodiment, the motor may operate to vibrate or move the main device along any axis, and is not limited to only vertical or horizontal. In another embodiment, the motors may operate together to rotate the main device, for example allowing the main device to rotate on a horizontal plane about a central axis, such as clockwise or counterclockwise with a stationary center point. In one embodiment of the invention, the motors may be used to allow the main device to be moved by being alternatively vibrated alternatively vibrated in a plurality of directions.

In one embodiment, measuring the charging rate may involve a circuit in the main device that measures measure the current from a receiving inductive coil in the main device. This may be used to drive a feedback loop indicating that the current received is increasing or decreasing in response to vibrationally initiated motion of the main device.

In one embodiment, the charging device or the main device may require the application of low friction coatings. One example of such a coating is polytetrafluroethylene (PTFE). PTFE has a low coefficient of friction while being able to survive high voltages before chemical breakdown due to the high dielectric strength. This may allow the main device to more easily move on the surface of the charging device, while still retaining its ability to efficiently charge.

In one embodiment of the invention, the multi axis vibration unit may be used for moving a main device along a resting surface as part of a game or application that may require the main device to be autonomously propelled to various positions.

In one embodiment of the invention, the multi axis vibration unit in the main device may be used for constrained feedback or function, such as vibrating in a certain direction corresponding to a "yes" or "no". For example, during a mobile phone discussion, the mobile phone may monitor, by means of speech recognition, a request by a remote party for a meeting at a particular date and time. Various applications and techniques relating to the field of speech recognition are known in the art and beyond the scope of the present invention. A background process running on the mobile phone may be used in conjunction with access to a user shared or privately stored calendar information accessed on or from the mobile phone. The background process may use the multi axis vibration unit to provide a "no" or "yes" vibration or shake. In one embodiment, a vibration along the vertical axis may correspond to the traditional western head shake response of up and down, i.e. north and south, for an affirmative or positive response, and a vibration along the horizontal axis, i.e. east and west, may correspond to the traditional western head shake response of left and right for a negative response. This would allow for immediate feedback to the user without requiring the user to remove the phone from a prone talking position to examine his or her calendar application. In one embodiment, FIG. 3 illustrates a user holding a main device 107 in the user's hand. The user may be able to feel the feedback against the user's hand.

In one embodiment, there may be multiple types of feedback. There are many types of vibrational feedback which may be used, for example the combinations and patterns may include one vertical vibration followed by one horizontal vibration, the feedback may be in series, in parallel, or any combination therein with various durations to provide multiple combinations of feedback mechanisms. Such feedback may be allocated or assigned anagrammatically to varying triggers, or in response to hardware signals. For example, applications may vibrate in the left right plane of the main device, phone calls may vibrate in the up and down plane of the main device, and text messages may use a combination of motion in both planes of the main device to simulate present vibrational feedback mechanisms derived from single rotational vibration motors. This feedback may be user customizable.

Figure 7:
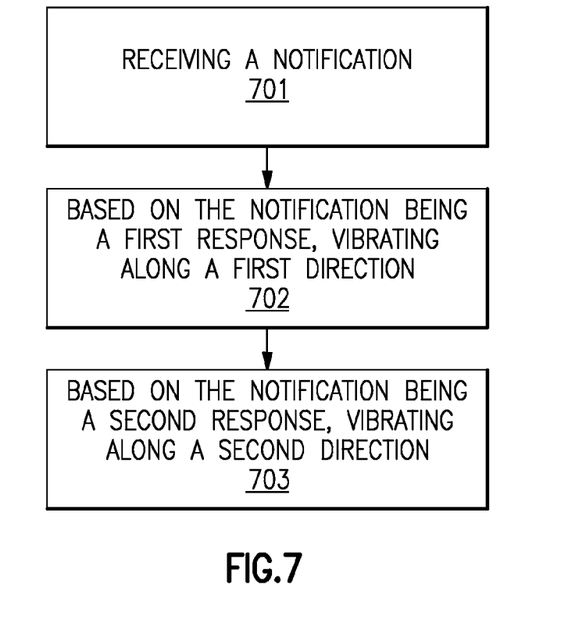
FIG. 7 illustrates a process for tactile feedback in a device in accordance with an embodiment of the invention.

One embodiment of a process for tactile feedback in a main device is described in reference to FIG. 7. A main device may comprise a function or application that may result in feedback to the user. As suggested above, this function or application may include phone calls, text messages, etc, which would provide notifications to the main device based on a function or application event. The main device receives a notification as a result of this functionality or application, 701. The notification may be a first result or a second result, each with an associated feedback. In one embodiment, there may be multiple results, each with its own associated feedback. The feedback may be performed by the main device through a multi axis vibration unit, which may be comprised of multiple motors, with each motor allowing vibration or movement along an axis. Each motor may be associated with a different axis, the same axis, or a combination thereof. If the notification is for a first result, the main device vibrates along a first direction, 702. If the notification is for a second result, the main device vibrates along a second direction, 703. In one embodiment, the first direction and second direction may be associated with a specific axis. In another embodiment, the first direction and the second direction may be associated with a combination of different axes. Thus, the first direction and second direction may be along a horizontal axis, vertical axis, or a combination thereof. Additionally, in another embodiment, the main device may be vibrated in pulses along the first direction and second direction.

As will be appreciated by one skilled in the art, the embodiments may be embodied as a system, method or computer program product. Accordingly, the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiment may take the form of a computer program product embodied in any tangible medium of expression having computer usable program code embodied in the medium.

Figure 8:
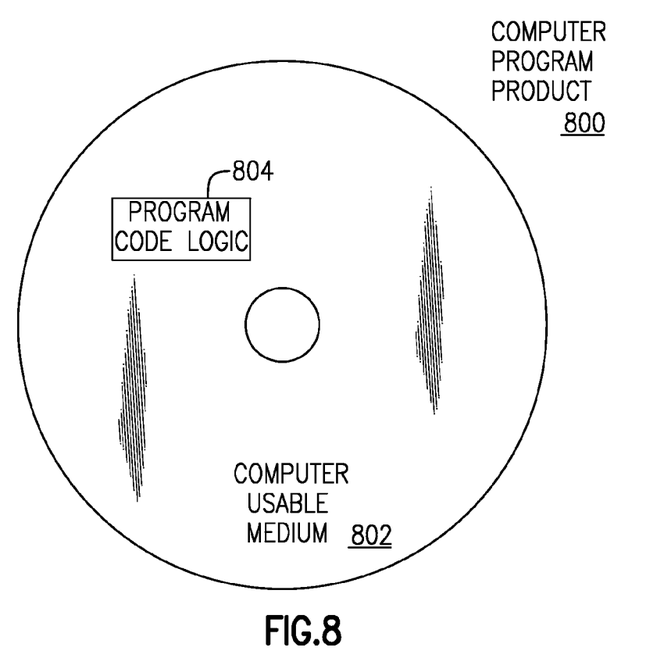
FIG. 8 illustrates a computer program product to incorporate an embodiment of the invention.

One example of a computer program product incorporating one or more aspects of an embodiment is described with reference to FIG. 8. A computer program product 800 includes, for instance, one or more computer usable media 802 to store computer readable program code means or logic 804 thereon to provide and facilitate one or more aspects of an embodiment. Any combination of one or more computer usable or computer readable medium(s) may be utilized. The computer-usable or computer-readable medium may be, for example but not limited to, an electronic, magnetic, optical, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable medium may be any storage medium that can contain or store the program for use by or in connection with the instruction execution system, apparatus, or device.

Computer program code for carrying out operations of the embodiment may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 9:
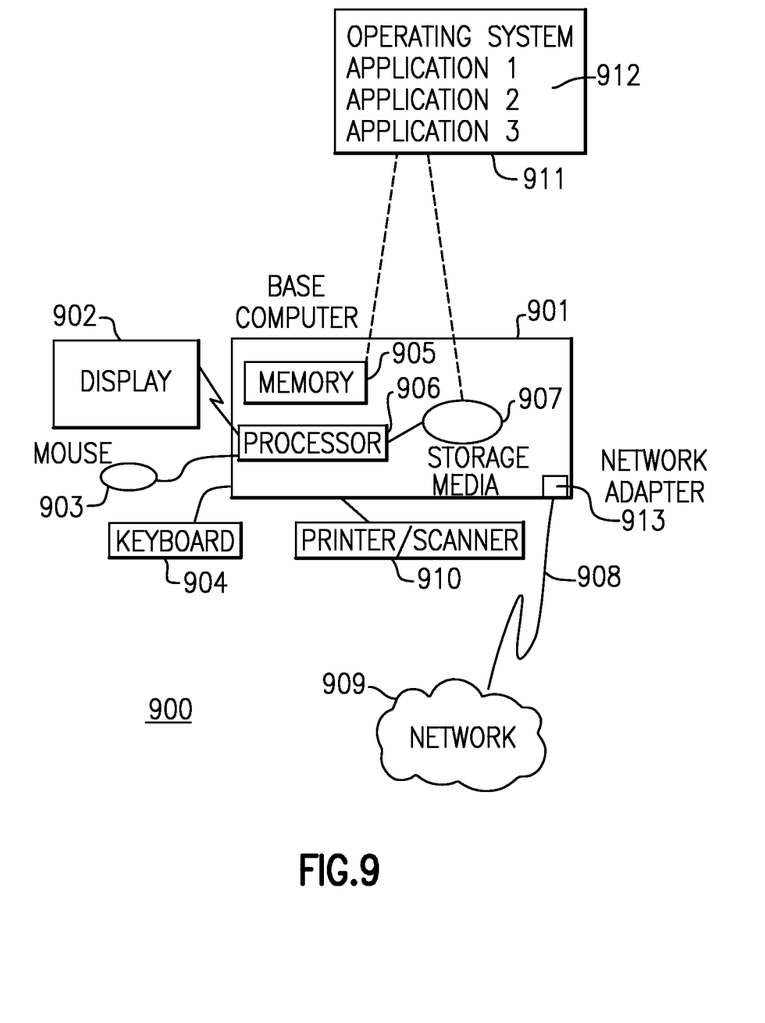
FIG. 9 illustrates a computer system in which an embodiment of the invention may be practiced.

FIG. 9 illustrates an embodiment of a system in which an embodiment may be practiced. The system comprises a computer system 901, such as a personal computer, a workstation, a server, a storage device, mobile device, or host, including optional peripheral devices. The computer system 901 includes one or more processors 906 and a bus employed to connect and enable communication between the processor(s) 906 and the other components of the computer system 901 in accordance with known techniques. The bus connects the processor 906 to memory 905 and long-term storage 907 which can include a hard drive (including any of magnetic media, CD, DVD and Flash Memory for example) or a tape drive for example. The computer system 901 might also include a user interface adapter, which connects the microprocessor 1006 via the bus to one or more interface devices, such as a keyboard 904, mouse 903, a printer/scanner 910 and/or other interface devices, which can be any user interface device, such as a touch sensitive screen, digitized entry pad, etc. The bus also connects a display device 902, such as an LCD screen or monitor, to the microprocessor 906 via a display adapter.

The computer system 901 may communicate with other computers or networks of computers by way of a network adapter 913, for example a network interface controller (NIC), capable of communicating 908 with a network 909. For example, network adapters may include communications channels, token ring, Ethernet or modems. The computer system 901 may also include a controller, not shown, connected to the network adapter. Alternatively, the computer system 901 may communicate using a wireless interface, such as a CDPD (cellular digital packet data) card. The computer system 901 may be associated with such other computers in a Local Area Network (LAN), VLAN, or a Wide Area Network (WAN), or the computer system 901 may be a client in a client/server arrangement with another computer, etc. All of these configurations, as well as the appropriate communications hardware and software, are known in the art.

Software programming code which embodies an embodiment may be typically accessed by the processor 906 from long-term storage media 907. The software programming code may be embodied on any of a variety of known media for use with a data processing system, as previously described above with reference to FIG. 8. The code may be distributed on such media, or may be distributed to users from the memory or storage of one computer system over a network to other computer systems.

Alternatively, the programming code 911 may be embodied in the memory 905, and accessed by the processor 906 using the processor bus. Such programming code may include an operating system which controls the function and interaction of the various computer components and one or more application programs 912. Program code may be normally paged from storage media 907 to memory 905 where it may be available for processing by the processor 906. The techniques and methods for embodying software programming code in memory, on physical media, and/or distributing software code via networks are well known and will not be further discussed herein. The computer program product medium may be typically readable by a processing circuit preferably in a computer system for execution by the processing circuit.

The flow diagrams depicted herein are just examples. There may be many variations to these diagrams or the steps (or operations) described therein without departing from the spirit of the embodiment. For instance, the steps may be performed in a differing order, or steps may be added, deleted or modified. All of these variations are considered a part of the claimed embodiment.

While the preferred embodiment has been described, it will be understood that those skilled in the art, both now and in the future, may make various improvements and enhancements which fall within the scope of the claims which follow.

What is claimed is:

1. A method comprising:
   charging a first device by a second device;
   determining, by said first device, a first position of said first device relative to said second device;
   based on said charging position, automatically moving, by said first device, into a second position on said second device, said first device comprising a first motor and a second motor, said first motor capable of moving said first device along a first axis, said second motor capable of moving said first device along a second axis;
   measuring a first charge rate based on said first position of said first device; and
   wherein said automatically moving based on said first position, further comprises:
      measuring a second charge rate based on said second position of said first device;
      comparing said first charge rate with said second charge rate; and
      based on said comparison, automatically moving said first device into a third position on said second device.

2. The method according to claim 1, wherein said second position and said third position are random movements.

3. The method according to claim 1, wherein automatically moving based on said comparison is further based on when said first charge rate has a lower value or equal value than said second charge rate.

4. The method according to claim 1, wherein automatically moving based on said comparison is further based on when said first charge rate has a higher value or equal value than said second charge rate; and
   wherein said third position is the same as said first position.

5. The method according to claim 1, further comprising:
   determining a distance from said first position to a beacon on said second device; and
   wherein said automatically moving is further based on said distance.

6. The method according to claim 5, further comprising:
   determining a rotational position from said first position to a second beacon on said second device;
   wherein said automatically moving is further based on said rotational position.

7. The method according to claim 5, wherein said second position is a position with an efficient charge rate on said second device.

8. The method according to claim 6, wherein said second position is a position with an efficient charge rate on said second device.

9. The method according to claim 1, further comprising placing said first device on said second device.

10. The method according to claim 1, wherein said first motor operates independently of said second motor.

11. The method according to claim 1, wherein said second device comprises a flat surface for said first device to move upon.

12. The method according to claim 1, wherein said automatically moving of said first device comprises rotating, by said first motor and said second motor, said first device.

13. The method according to claim 1, wherein automatically moving of said first device comprises being alternatively vibrated in a plurality of directions.

14. A computer system comprising:
   a first device;
   a second device;
   a memory;
   a processor in communication with said memory, said processor comprising an instruction fetching unit for fetching instructions from memory and one or more execution units for executing fetched instructions;
   wherein said computer system is capable of performing a method comprising:
      charging a first device by a second device;
      determining a first position of said first device relative to said second device;
      based on said charging position, automatically moving into a second position on said second device, said first device comprising a first motor and a second motor, said first motor capable of moving said first device along a first axis, said second motor capable of moving said first device along a second axis;
      measuring a first charge rate based on said first position of said first device; and
      wherein said automatically moving based on said first position, further comprises:

measuring a second charge rate based on said second position of said first device;

comparing said first charge rate with said second charge rate; and based on said comparison, automatically moving said first device into a third position on said second device.

15. The computer system according to claim 14, wherein automatically moving based on said comparison is further based on when said first charge rate has a lower value or equal value than said second charge rate.

16. The computer system according to claim 14, wherein automatically moving based on said comparison is further based on when said first charge rate has a higher value or equal value than said second charge rate; and wherein said third position is the same as said first position.

17. The computer system according to claim 14, further comprising:

determining a distance from said first position to a beacon on said second device;

determining a rotational position from said first position to a second beacon on said second device; and wherein said automatically moving is further based on said distance and said rotational position.

18. A computer program product, the computer program product comprising:

a Non-transitory storage medium readable by a processing circuit and storing instructions for execution by the processing circuit for performing a method comprising:

charging a first device by a second device;

determining a first position of said first device relative to said second device;

based on said charging position, automatically moving into a second position on said second device, said first device comprising a first motor and a second motor, said first motor capable of moving said first device along a first axis, said second motor capable of moving said first device along a second axis;

measuring a first charge rate based on said first position of said first device; and wherein said automatically moving based on said first position, further comprises:

measuring a second charge rate based on said second position of said first device;

comparing said first charge rate with said second charge rate; and based on said comparison, automatically moving said first device into a third position on said second device.

\* \* \* \* \*